Oct. 13, 1925.
R. R. OTIS
1,556,801
SPEEDOMETER ATTACHMENT
Filed Aug. 14, 1923    2 Sheets-Sheet 1
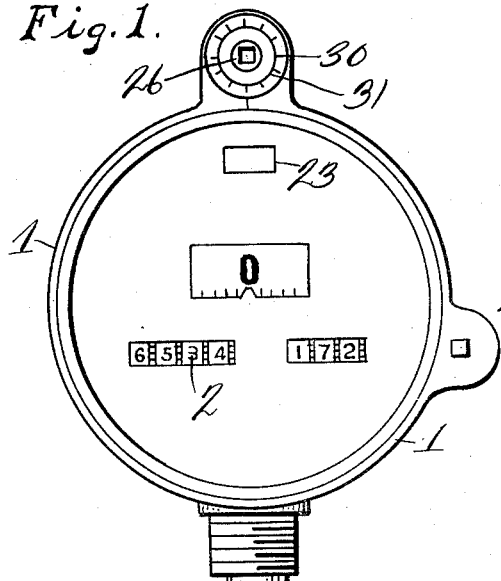
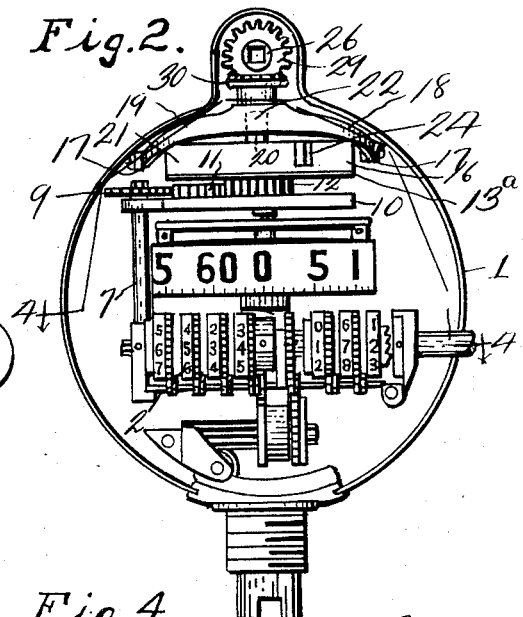
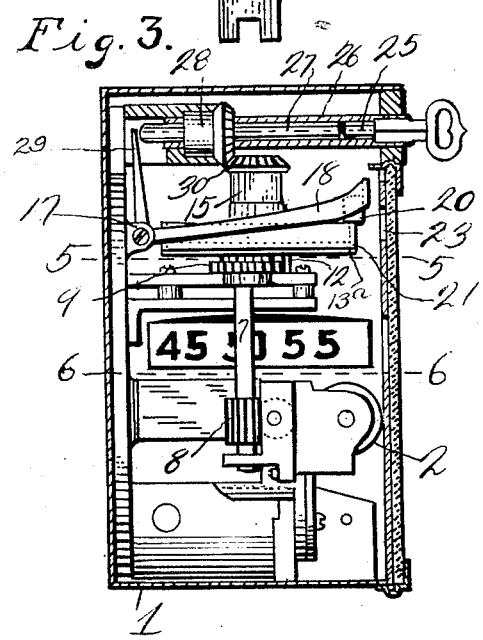
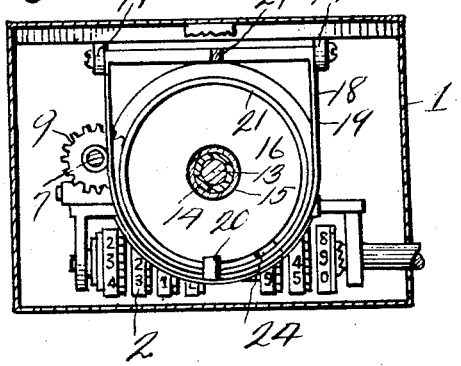
INVENTOR.
Rolland R. Otis.
BY Philip A. Ferrell
ATTORNEY.

Oct. 13, 1925. 1,556,801
R. R. OTIS
SPEEDOMETER ATTACHMENT
Filed Aug. 14, 1923   2 Sheets-Sheet 2

INVENTOR.
Rolland R. Otis.
BY
ATTORNEY.

Patented Oct. 13, 1925.

1,556,801

UNITED STATES PATENT OFFICE.

ROLLAND R. OTIS, OF OMAHA, NEBRASKA.

SPEEDOMETER ATTACHMENT.

Application filed August 14, 1923. Serial No. 657,331.

*To all whom it may concern:*

Be it known that ROLLAND R. OTIS, a citizen of the United States, residing at Omaha, in the county of Douglas and State of Nebraska, has invented certain new and useful Improvements in Speedometer Attachments, of which the following is a specification, reference being had therein to the accompanying drawings.

The invention relates to speedometer attachments used in connection with motor driven vehicles, and has for its object to provide in combination with a device of this character, means whereby a signal will be given at the end of a predetermined number of miles of travel, thereby warning the operator of the automobile that his engine needs attention, for instance requires oil, or changing of cylinder oil, which is customary after traveling a certain distance.

A further object is to provide a horizontally disposed rotatable disc rotated through a gear train in gear with the accumulator wheels of the speedometer, said disc being provided with a split sleeve, which frictionally engages within a sleeve of a flanged disc, which flanged disc rotates with the first mentioned disc until stopped by the engagement of a lug carried by a yoke with a notch in the flange of the flanged disc, which yoke simultaneously exposes a signal.

A further object is to provide the yoke with an upwardly extending arm, in the path of a horizontally disposed slidable shaft extending through a gear having a gear connection with the sleeve of a flanged disc and forming means, when engaged by a key, whereby the flanged disc may be released by rocking of the yoke and the flanged disc moved to a position where the notch therein will not register with the lug of the yoke and consequently resetting the signal out of operative position.

A further object is to provide a dial whereby the amount of retrograde movement of the frictionally held flanged disc may be easily gaged for the operation of the signaling device at a predetermined number of miles.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a front elevation of the speedometer showing the device applied thereto.

Figure 2 is front elevation of the speedometer showing the face plate removed.

Figure 3 is a vertical transverse sectional view through the speedometer.

Figure 4 is a sectional view through the device taken on line 4—4 of Figure 2.

Figure 5:
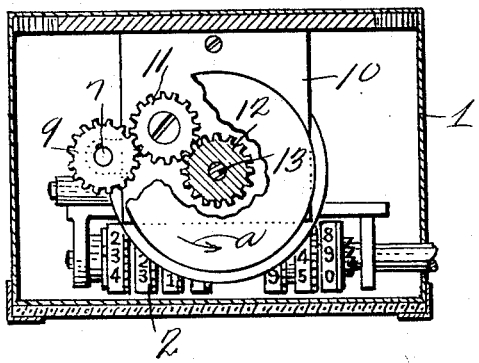
Figure 5 is a horizontal sectional view through the device taken on line 5—5 of Figure 3.
Figure 7:
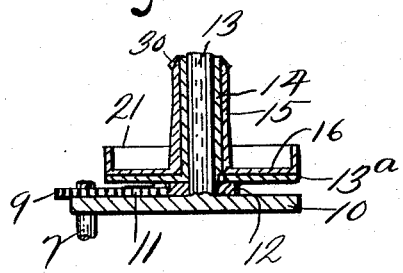
Figure 7 is a detail vertical sectional view through the rotatable disc and the flanged disc.
Figure 6:
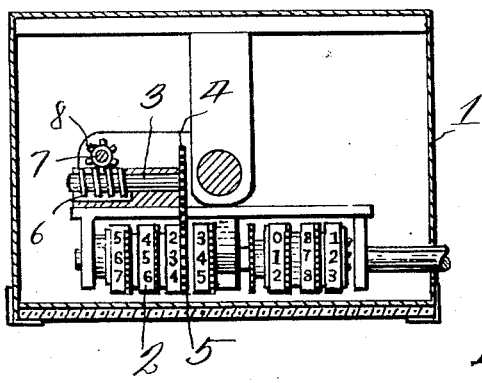
Figure 6 is a horizontal sectional view taken on line 6—6 of Figure 3.
Figure 8:
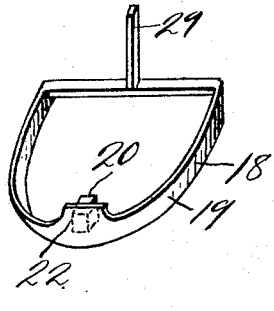
Figure 8 is a perspective view of the pivoted yoke.
Figure 9:
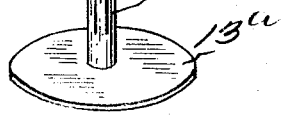
Figure 9 is a perspective view of the rotatable disc showing the split sleeve carried thereby.

Referring to the drawing, the numeral 1 designates the casing of a conventional form of speedometer and 2 the accumulating wheel for indicating the number of miles the vehicle has traveled. Rotatably mounted in a bearing located to the rear of the accumulator wheels 2 is a horizontally disposed shaft 3, which shaft is provided with a gear 4, which meshes with a gear 5 carried by one of the accumulator wheels, therefore it will be seen that during the rotation of the accumulator wheels 2 the shaft 3 will rotate, thereby imparting rotation to the worm 6 carried thereby. Vertically disposed within the casing 1 adjacent the outer end of the shaft 3 is a shaft 7, which is provided with a worm gear 8, with which the worm 6 engages, consequently during the rotation of the worm 6 the vertically disposed shaft will be simultaneously rotated, thereby rotating the horizontally disposed gear 9 carried by its upper end, which gear is disposed above a horizontally disposed partition 10. The gear 9 meshes with an idle gear 11, which gear is rotatably mounted on the upper side of the partition 10, and in turn meshes with a gear 12, which is rotatably mounted on the vertically disposed shaft 13 carried by the partition 10. It will be seen that as the accumulator wheels 2 are rotated through the usual mechanism, a constant rotation is imparted to the gear 12. The gear 12 is secured to a horizontally disposed disc 13ª, which is provided with a vertically disposed split sleeve 14, which sleeve has an expansive action and frictionally engages the inner periphery of the sleeve 15 of the flanged disc 16, therefore it will be seen that during the rotation of the disc 13ª, the flanged disc 16 will be rotated incident to the frictional engagement of the split sleeve 14 with the inner periphery of the sleeve 15. The ratio of the gears connecting the disc 13ª to the accumulator wheels 2 will vary according to the make of car, and the periods of necessary lubrication, for instance if the lubricating period is at a thousand miles, the speed of gearing is proportioned whereby a substantially completed revolution in the direction of the arrow *a* will be imparted to the flanged disc 16 when the vehicle has traveled substantially one thousand miles.

Pivotally mounted on lugs 17 carried by the rear side of the casing 1 is a yoke 18, the U-shaped portion 19 of which is large enough to receive therein the flanged disc 16, however the yoke is disposed above said flanged disc 16, and is provided with an inwardly extending lug 20, which slidably engages the flange 21 of the disc 16, and holds the signal 22 carried by the yoke out of registration with the sight opening 23. However when the flanged disc 16 is rotated to a position where its recess 24 will register with the lug 20, the yoke moves downwardly at its forward free end to a position where the signal 22 will register with the sight opening 23, thereby warning the driver that a predetermined number of miles have been traveled, and it is time to replenish the oil within the engine or cylinder. It will be seen that when the lug 20 is disposed within the recess 24 that the flanged disc 16 will be held against rotation, however during the holding of the flanged disc 16, the frictional engagement of the sleeves 14 and 15 is broken, and consequently the disc 13 continues to rotate incident to the continued rotation of the gear and shaft connections with the accumulator wheels 2.

After the signal has been exposed and the operator has observed the same and replenished the oil within his engine, the device is again set for operation by inserting a key 25 in the hollow shaft 26, and into engagement with a polygonal shaped shaft 27, which is slidably mounted in the hollow shaft 26. Shaft 27 extends through a bevelled gear 28 and when forced rearwardly engages an upwardly extending arm 29 carried by the yoke 18, thereby rocking said yoke upwardly at its free end, and the signal 22 out of registration with the sight opening 23. The bevelled gear 28 meshes with a bevel gear 30 carried by the upper end of the sleeve 15 of the flanged disc 16, and it will be seen that by rotating the key 25 within the hollow shaft 26, which is carried by the gear 27, the flanged disc may be rotated to a position where the recess 24 in the flange 21 thereof will be out of registration with the lug 20, thereby resetting the device. The number of miles the flanged disc 16 is moved during the resetting operation may be indicated if desired on a scale 31.

From the above it will be seen that a signalling device is provided in connection with speedometers and motor driven vehicles which signalling device will accurately indicate to the operator of an automobile when he has traveled a predetermined number of miles and it is necessary to give the engine attention, for instance as replenishing the oil therein.

The invention having been set forth what is claimed as new and useful is:—

1. The combination with a speedometer, of a signalling device in connection therewith, said device comprising a constantly rotated disc, gear and shaft connections between the disc, and a constantly rotated portion of the speedometer, a flanged disc frictionally connected to the constantly rotated disc, a yoke pivoted above the flanged disc, and a lug engaging the flange of the flanged disc and adapted to be received within a recess in the flange of the flanged disc when said disc reaches a predetermined position, said lug when in the recess of the flange registering with a sight opening and forming a signal.

2. The combination with a speedometer, of a signalling device carried thereby, said device comprising a constantly rotated disc, a disc frictionally connected to the constantly rotated disc, an upwardly extending flange carried by the last named disc and provided with a recess, a pivoted yoke above the frictional disc, a lug carried by the pivoted yoke in the path of the recess of the frictional disc, said lug forming a signalling device and adapted to register with a sight opening, and means cooperating with the frictional disc whereby said disc may be independently rotated.

3. The combination with a speedometer, of a signalling device carried thereby, said device comprising a constantly rotated disc, a split sleeve carried by said disc, a flanged disc mounted on the constantly rotated disc, said flanged disc being provided with a sleeve in which the split sleeve is disposed and frictionally engages, a pivoted yoke above the flanged disc, a lug carried by the pivoted yoke in the path of a recess in the flanged disc, means whereby said pivoted yoke may be moved and held in raised position and the flanged disc simultaneously rotated, said lug when in the recess of the flanged disc registering with a sight opening and forming a signal.

In testimony whereof I hereunto affix my signature.

ROLLAND R. OTIS.